No. 788,877. PATENTED MAY 2, 1905.
G. W. BLACKBURN.
FISH HOOK.
APPLICATION FILED AUG. 20, 1904.
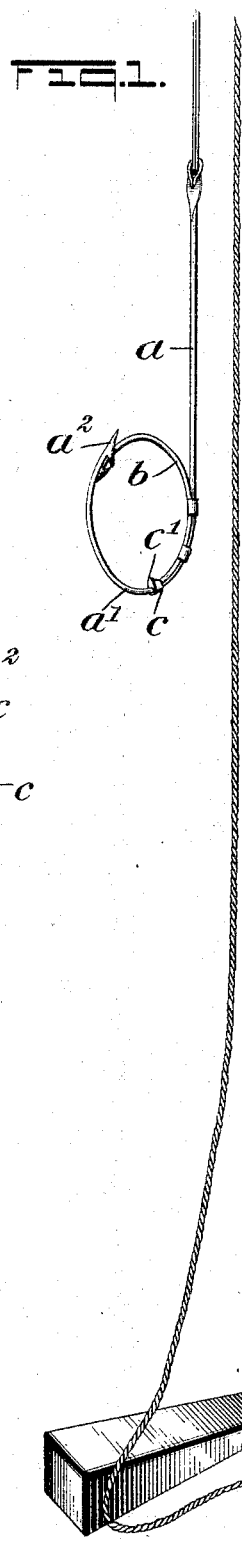
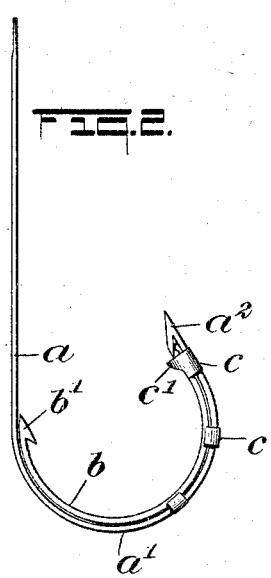
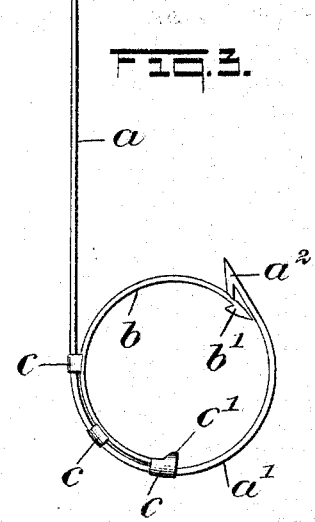
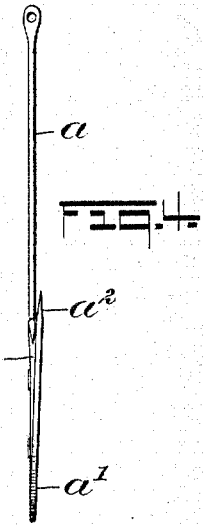
WITNESSES:
INVENTOR
George W. Blackburn
BY
ATTORNEYS No. 788,877. Patented May 2, 1905.

UNITED STATES PATENT OFFICE.

GEORGE WASHINGTON BLACKBURN, OF SARASOTA, FLORIDA.

FISH-HOOK.

SPECIFICATION forming part of Letters Patent No. 788,877, dated May 2, 1905.

Application filed August 20, 1904. Serial No. 221,523.

*To all whom it may concern:*

Be it known that I, GEORGE WASHINGTON BLACKBURN, a citizen of the United States, and a resident of the city of Sarasota, in the county of Manatee and State of Florida, have invented a new and Improved Fish-Hook, of which the following is a full, clear, and exact description.

The purpose of this invention is to construct a fish-hook so as to minimize the danger of losing the fish when once hooked. This end I attain by providing the hook as usually constructed with a peculiarly-arranged spur, which is preferably barbed and which is mounted on the hook so as to come into action when the fish is hooked, the spur moving toward the point of the hook proper and forming therewith a complete ring or inclosure from which it is almost impossible for the fish to become disengaged.

This specification is an exact description of one example of the invention, while the claims define the actual scope thereof.

Reference is had to the accompanying drawings, which form part of this specification, in which drawings like characters of reference indicate like parts in the several views, and in which—

Figure 1 is a view showing the lower part of a fishing-line with two of my improved hooks attached. Fig. 2 is an enlarged side elevation of the hook. Fig. 3 is a similar view, excepting that the safety-spur is shown in active position; and Fig. 4 is a front view of the hook, also with the spur in active position.

$a$ indicates the shank of the hook, $a'$ the bend, and $a^2$ the barbed point, which may be of the usual or any desired construction, excepting that preferably the bend $a'$ is formed in the shape of an arc to permit the easy movement of the spur, as will hereinafter fully appear.

$b$ indicates the spur, which, as here shown, is provided with a barbed point $b'$. This spur is also preferably arc-shaped and is provided with one or more eyes $c$, loosely receiving the bend $a'$ of the hook proper, so as to slidably mount the spur on the hook and permit the same to assume either of the positions shown in Figs. 2 and 3 or any position intermediate thereof. The eye $c$ adjacent to the point of the hook proper is provided with a projecting part $c'$, which is intended to engage the mouth of the fish when the parts are in the position shown in Fig. 2, and thus cause the spur to be moved around the bend $a'$ of the hook and to reach over in close proximity to the point $a^2$, as shown in Fig. 3, thus forming a complete ring inclosing the part of the fish which is hooked and preventing the escape of the fish, excepting in case the mouth of the fish is torn away.

In the use of the invention the hook is adjusted as in Fig. 2 and is baited and cast in the usual manner. Upon the fish striking the hook the previously-inactive spur will reach over into the active position, (shown in Fig. 3,) the barbed point $b'$ entering the fish and making its escape practically impossible.

Various changes in the form, proportions, and minor details of my invention may be resorted to at will without departing from the spirit and scope thereof. Hence I consider myself entitled to all such variations as may lie within the terms of my claims.

Having thus described my invention, I claim as new and desire to secure by Letters Patent—

1. A fish-hook provided with an auxiliary spur slidably mounted on the hook and adapted to be moved toward the point of the hook by a fish striking the hook.

2. A fish-hook provided with an auxiliary spur slidably mounted on the bend of the hook and adapted to be moved into active position by the fish striking the hook.

3. A fish-hook provided with a curved or arc-shaped auxiliary spur slidably mounted on the bend of the hook.

4. A fish-hook provided with a curved or arc-shaped auxiliary spur, and a collar attached thereto and slidably mounted on the bend of the hook, said collar having a projection adapted to be engaged by the fish for the purpose specified.

5. A fish-hook provided with a curved or arc-shaped auxiliary spur slidably mounted on the bend of the hook and adapted to be moved from the shank of the hook over toward the point thereof, by a fish striking the hook.

In testimony whereof I have signed my name to this specification in the presence of two subscribing witnesses.

GEORGE WASHINGTON BLACKBURN.

Witnesses:
 FRANK HIGEL,
 BENJ. STICKNEY.